Dec. 9, 1958  S. H. VASOLD  2,863,575
STORAGE HOPPERS

Filed Dec. 31, 1952  4 Sheets-Sheet 1

INVENTOR.
Samuel H. Vasold.
BY
Fearman & Fearman,
ATTORNEYS

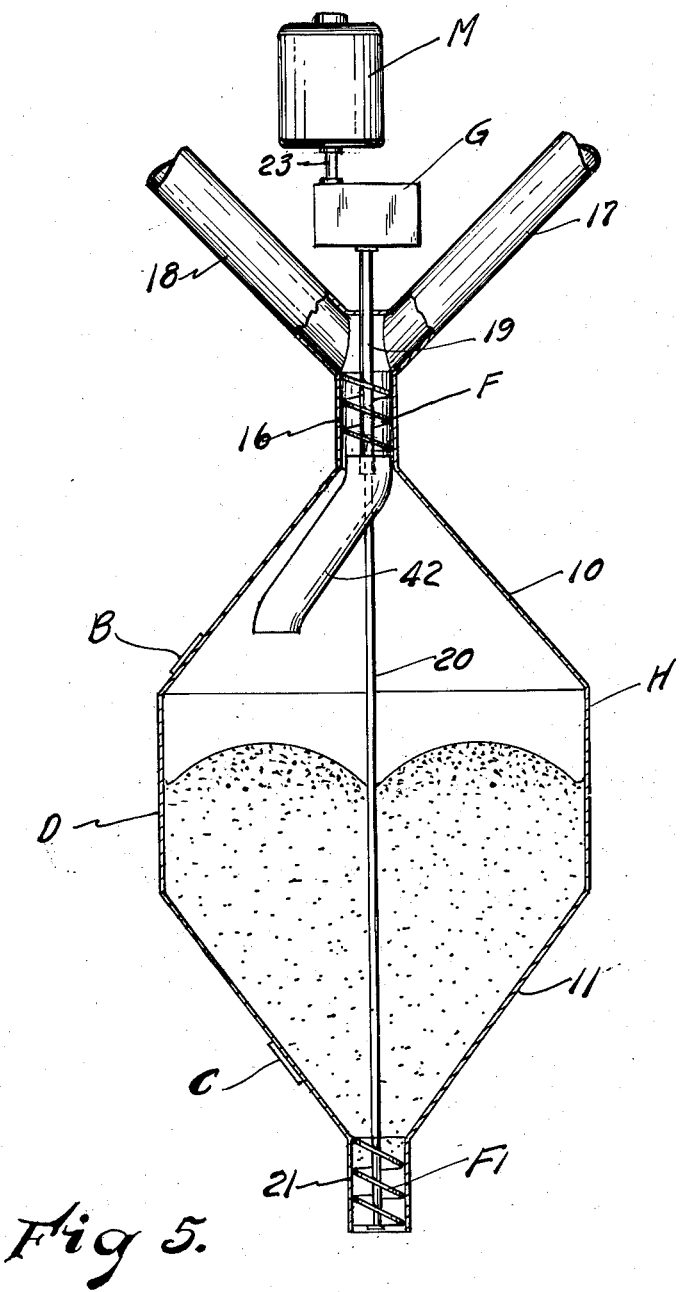

Dec. 9, 1958  S. H. VASOLD  2,863,575
STORAGE HOPPERS
Filed Dec. 31, 1952  4 Sheets—Sheet 4
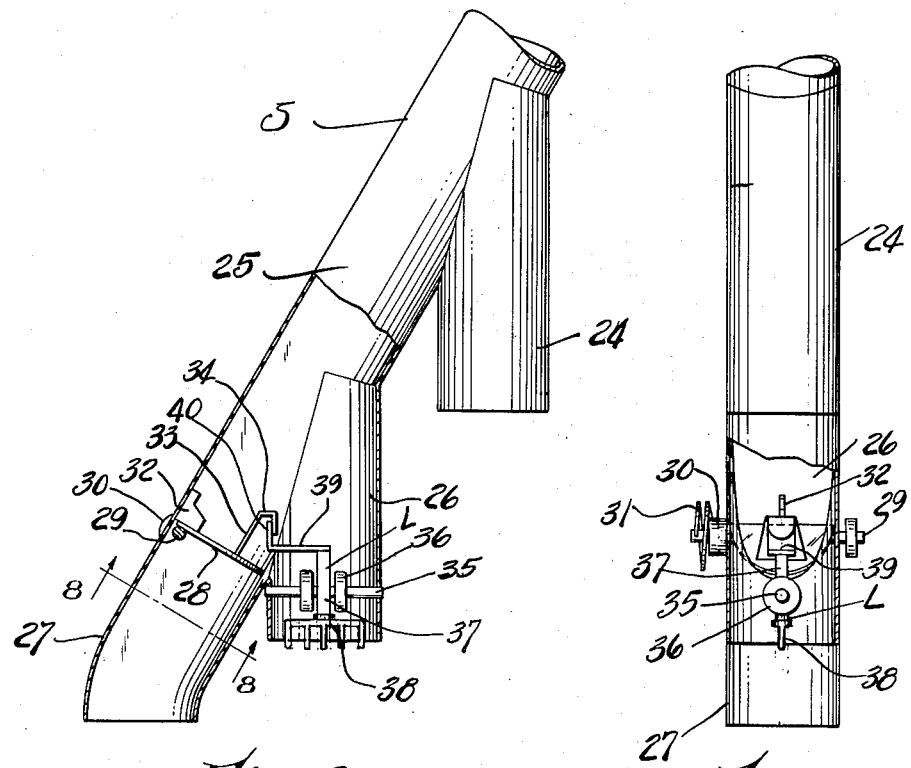
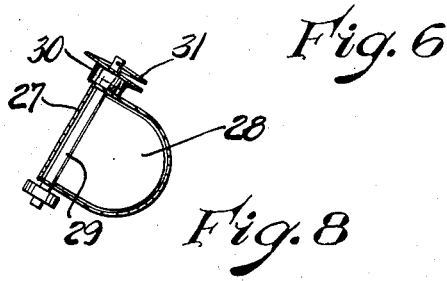
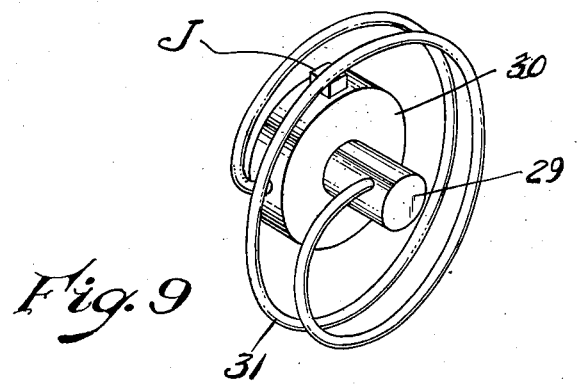
INVENTOR.
Samuel H Vasold
BY
Fearman & Fearman
ATTORNEYS

# United States Patent Office 2,863,575
Patented Dec. 9, 1958

2,863,575

STORAGE HOPPERS

Samuel H. Vasold, Bridgeport, Mich.

Application December 31, 1952, Serial No. 328,977

20 Claims. (Cl. 214—17)

This invention relates to hoppers or bins for the storage of granular bulk materials of all kinds without segregation of the particles, and more particularly to a hopper which when material is drawn therefrom, releases the material stored therein in the order in which it was fed into the hopper.

In certain fields where perishable materials or materials of a nature which cannot be stored indefinitely are processed in bulk into multiple compartment storage bins or hoppers at intervals until the compartments are filled, it is highly desirable to remove the material in the order in which it is supplied to the hopper, i. e., first in first out.

One of the prime objects of the invention is to provide a hopper having a plurality of concentrically arranged bins or compartments, together with means for uniformly and progressively filling each of said bins or compartments consecutively, and provide withdrawal means so arranged that the bins will be emptied of their storage material in the order in which they were filled.

Another object of the invention is to provide a simple, practical, and economical, selectively-actuated means for positively feeding material to or withdrawing the material from the hopper to prevent pressure differentials from building up therein.

A further object is to provide automatic means to insure that the inner compartments are completely filled before allowing incoming material to be discharged into the outer compartment, thus eliminating any building up of excessive air pressure in the hopper, and insuring maximum hopper capacity and a uniform discharge or withdrawal therefrom.

A still further object is to provide a gate control mechanism actuated by the material in the adjacent bin or compartment, so that the gate may be actuated to permit incoming material to discharge into another compartment.

A further object is to design simple, practical and effective means for securing a gate in closed position, which means is actuated when the incoming material reaches a predetermined level in one of the bins.

To the accomplishment of the foregoing and related ends, said invention then consists in the combination and means hereinafter described, and particularly pointed out in the claims, the annexed drawings and following description setting forth, in detail, certain means and one mode of carrying out the invention, such disclosed means and mode illustrating, however, but one of the various ways in which the principle of the invention may be used.

In the drawing:

Fig. 5 is a view similar to Fig. 1 with the inner shell members eliminated.

Fig. 6 is an enlarged, fragmentary, side elevational view of the distributing spout and drag latch mechanism, parts being broken away to clearly show the construction.

Fig. 7 is a part sectional, opposite edge elevational view.

Fig. 8 is a transverse sectional view taken on the line 8—8 of Fig. 6.

Fig. 9 is an enlarged, perspective view showing the manner of tensioning the spout gate.

Figure 1:
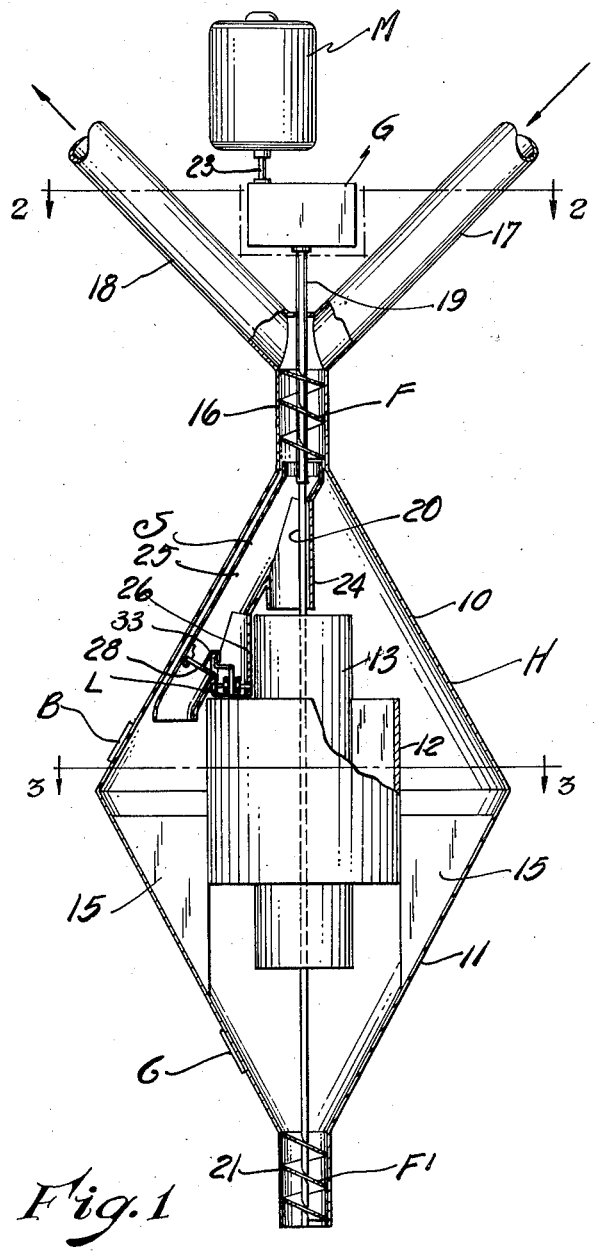
Fig. 1 is a sectional, side elevational view of my storage hopper.
Figure 2:
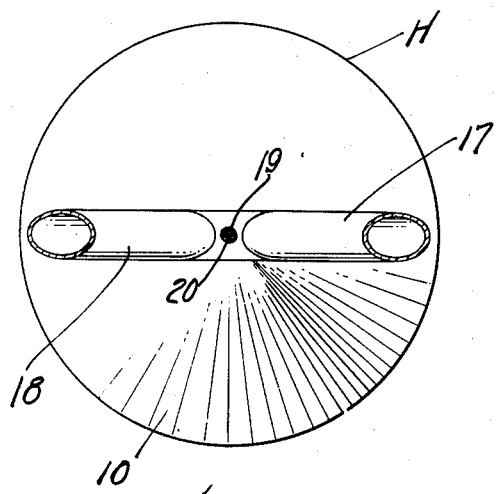
Fig. 2 is a top plan view thereof.
Figure 3:
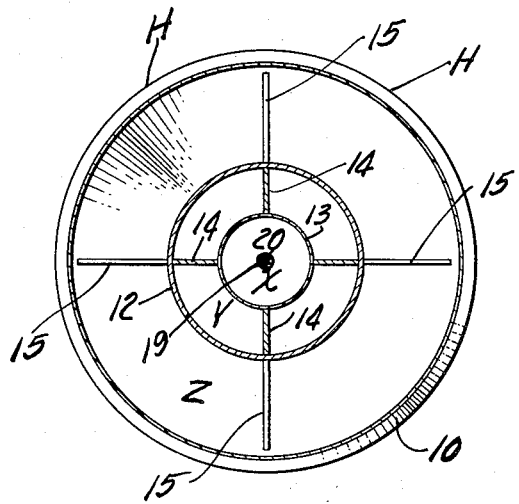
Fig. 3 is a sectional, plan view taken on the line 3—3 of Fig. 1.
Figure 4:
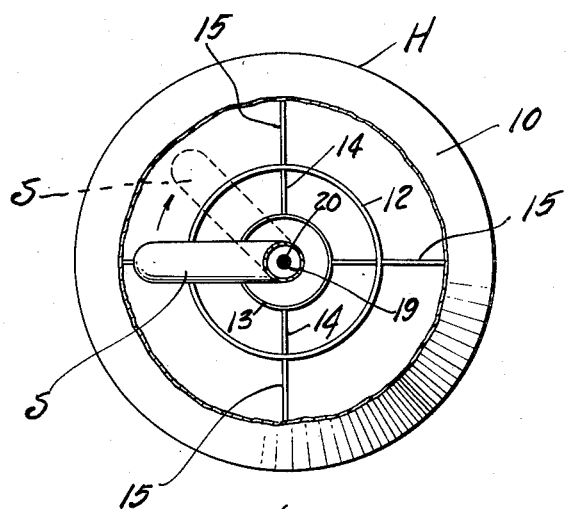
Fig. 4 is also a sectional, plan view, the upper part of the hopper being broken away to show the interior, the broken lines illustrating the rotation of the distributing spout.

Referring now more particularly to Figs. 1, 2, 3, 4, 6, 7, 8 and 9 of the drawings in which I have shown the preferred embodiment of my invention, a letter H generally indicates my hopper member which includes a pair of conical-shaped members 10 and 11 with their base ends arranged in opposed, abutting relation and welded together to form a unitary outer casing structure.

Concentrically arranged centrally within the hopper H are spaced-apart, cylindrical shell members 12 and 13, connected by baffles 14, and supported by spacers or baffles 15 mounted in the lower member 11. These members 12 and 13 and the outer wall of the hopper define individual bins or compartments X, Y and Z, the innermost shell member 13 being of greater length than the member 12, and the ends of both members terminating at points spaced from the ends of the hopper as clearly shown in Fig. 1 of the drawings. A tubular section 16 forms an extension of the member 10, and angularly disposed tubular spouts or extensions 17 and 18 communicate with the upper end of the section 16, all as clearly shown in Figs. 1 and 5 of the drawings.

A centrally disposed gear reduction unit G is provided directly above the hopper H in alignment with the section 16, and a sleeve 19 is drivingly connected to the gearing (not shown) provided in said reduction unit, said sleeve projecting into section 16, and a conventional conveyor flight or screw F is mounted on said sleeve for rotation therewith, and for a purpose to be presently described.

A centrally disposed, vertical shaft 20 is also mounted in the reduction unit G and extends through the sleeve 19 and hopper H and into the tubular hopper extension 21 provided on the lower end of the member 11, a conveyor flight or screw $F^1$ being mounted on the shaft 20 within the extension 21 for positively discharging material from the hopper when the magnetic clutch (not shown) provided on the unit G is connected, and a control panel (not shown) can be provided adjacent the extension 21 to provide for easy control. The clutch (not shown) is of the conventional magnetic type and is connected in a manner to drive either the sleeve 19 and conveyor F or the shaft 20 and conveyor $F^1$ as desired.

A motor M is connected to a suitable source of power supply, the shaft 23 being connected to the gear reduction unit G to provide the necessary power for operation of the sleeve and shaft, and it will be clear that selective actuation of the conventional clutch permits the separate filling of the compartments or the withdrawal of materials from the hopper as desired.

The angularly disposed spout 17 leads from an elevator or other source of material supply (not shown), and opens to the conveyor F, and the spout 18 leads to a dust cyclone or the like (not shown) to eliminate dust etc.

A distributing feed spout S is mounted on the lower end of the sleeve 19 and is rotatable therewith, said spout being formed with a centrally disposed leg extension 24 open to the upper end of compartment X, and an angularly disposed spout 25 opens to compartment Z, an offset vertical leg 26 being provided on the spout 25, and opens to compartment Y, these compartments being progressively filled as the mechanism is actuated. The lower end section of the spout 25 is flattened on one side as at 27, and a closure plate or gate 28 is mounted on the hinge pin 29, a collar 30 being mounted on said pin and is secured to the spout in any desired manner, and a spring 31 is anchored to the pin and collar respectively for tensioning said gate. This gate 28, when in closed position shown in Figs. 6, 7 and 8, prevents the flow of material therethrough into the compartment Z until the inner compartments X and Y have been filled, all as will be hereinafter described, and it will be obvious that the compartments are consecutively fed and filled.

The spring-tensioned hinge pin 29 normally maintains the gate 28 in closed position, forming a closure for the lower end of the spout 25, so that the incoming material flows through spout 25, thence through leg 26 to compartment Y. A stop 32 is provided in the lower end of spout 25 to limit upward swing of the gate, and an extending bracket 33 is provided on the one face of the gate, the end being hook-shaped as at 34 for engagement by a drag latch L which releasably secures the gate in position.

The drag latch L is rockably mounted on a pin 35 between conventional collars 36—36, and comprises the bar 37 having a depending comb section 38 on the free end thereof, the upper end of the bar being offset as at 39 and thence extends upwardly as at 40 for engagement with the turned end 34 of the extending bracket 33. The comb section 38 of the drag latch L extends into the upper end of the compartment Y, and as the compartment Y is filled to a predetermined level, the comb 38 will drag the material, swinging the latch L on the pin 35 so that the section 40 of said latch is disengaged from the hook 34, thus permitting the gate 28 to swing to open position and the incoming material to discharge into the outer compartment Z.

Bin indicators B and C are provided on the conical members 10 and 11, these indicators being connected to the source of material supply (not shown), the indicator B serving to shut off the supply of incoming material, and the indicator C serving to start the refilling of the hopper before the entire hopper content is exhausted, and I do not deem it necessary to show or describe these indicators in detail, as they are of conventional design at present on the market.

In practice, the bulk material flows, by gravity, in spout 17 from the elevator (not shown), and is fed into the hopper H by the conveyor F, the suction in the spout 18, created by the dust cyclone (not shown), sucks the dust and light foreign particles away from the hopper, and the screw conveyor F serves to retard suction of air out of the hopper.

The operation is as follows: When the sleeve 19 is driven, the material flows to conveyor F, and is thence discharged into the distributing spout 24 which feeds into center compartment X until it is completely filled, after which the material flows through spout 25 into leg 26 until the compartment Y is filled to a predetermined level. The drag latch L is then actuated to permit gate 28 to swing open, so that the material then flows to outer compartment Z, and it will be obvious that all compartments will be completely filled due to rotation of the distributing spout and the even distribution of the incoming materials.

In Fig. 5 of the drawings, I have shown a modified construction in which the cylindrical shells 12 and 13 are omitted, and the distributing spout comprises but a single leg 42 which rotates in exactly the same manner as does the distributing spout previously described, the incoming material discharging in a circle to spread the material uniformly over the area being filled.

When it is desired to empty the hopper, the compartments empty in the order named (X, Y and Z), so that the material first fed into the hopper is first withdrawn. To withdraw material from the hopper, the clutch (not shown) is actuated to drive shaft 20 and conveyor $F^1$ to discharge the material desired.

The storage hopper is particularly effective in fields where storage hoppers are not filled or emptied in one operation, and the materials are perishable or of such nature that storage time is an important factor.

It will be understood that the size and capacity of the hopper can be readily increased, it is only necessary to separate the sections 10 and 11 and weld a cylindrical band D (see Fig. 5) of required height in between these members.

From the foregoing description, it will be obvious that I have perfected a very simple, practical, and economical hopper for storage of fragmentary materials of all kinds.

What I claim is:

1. In a storage hopper, an upright casing having reduced intake and discharge end sections, at least one inner shell mounted within said casing and spaced therefrom to form inner and outer compartments, said inner shell being spaced from the upper end of said casing a rotating feeder unit above said shell and in said casing feeding the admitted material consecutively into said compartments, means for driving said feeder unit for a predetermined interval to feed said material in a circumferentially moving stream, and means permitting withdrawing material from said compartments individually in the order in which they were filled.

2. In a storage hopper, an upright casing having reduced intake and discharge end sections, at least one inner shell concentrically mounted within the casing and spaced from the ends and sides thereof to form inner and outer compartments, a rotating feeder unit mounted in the upper end of said casing above said shell feeding the admitted material consecutively to said compartments, said feeder unit including a spout terminating adjacent the upper end of said inner shell for feeding into said inner compartment, and an angularly disposed leg communicating with said spout and inside said casing so as to feed into the outer compartment, and means for driving said feeder unit, the lower portion of said casing being tapered to permit withdrawal of stored material from said compartments consecutively in the order in which they were filled.

3. In a storage hopper, an upright casing formed with upper and lower reduced end sections, means in said upper end section for admitting granular material to the upper end of the casing, means in said lower section permitting the withdrawal of material through the lower end of the casing, a pair of spaced-apart shells concentrically mounted within said casing and spaced from the ends and sides thereof to form individual compartments therein, the shells extending into said lower end section of said casing with the inner shell projecting beyond the outer shell, a rotating feeder unit mounted in the upper end of said casing above said shell and having communicating legs terminating within the casing adjacent the respective compartments for filling said compartments consecutively, and means for driving said feeder unit, the lower portion of said casing converging to permit the emptying of said compartments consecutively in the order in which they were filled.

4. The combination as defined in claim 3 in which said feeder unit includes a spout terminating over the innermost compartment, a branch leg angling outwardly therefrom and terminating at a point below the upper end of the outer shell, and a spout leg interjacent the ends of said branch leg and discharging into the intermediate compartment.

5. The combination as defined in claim 3 in which the means in said reduced end sections comprises selectively actuated screw conveyors for positively feeding material into and discharging material from said hopper.

6. The combination as defined in claim 3 in which said innermost shell extends below the outer shell, and peripherally spaced baffles connecting said shells and the outer shell.

7. In a storage hopper, an upright casing having a lower, inwardly tapering discharge end, at least one shell concentrically mounted therein and spaced therefrom to form inner and outer compartments, said shell being spaced from the ends of said casing, means in the upper and lower ends of said casing for admitting material to and permitting withdrawal of material from said hopper respectively, and a continuously revolving feeder unit mounted in the upper end of said casing above said shell filling having a portion feeding directly into said inner compartment and a portion feeding directly into the outer compartment, and means blocking flow into said outer compartment while the incoming material fills said inner compartment.

8. The combination as defined in claim 7 in which tubular extensions are provided on the ends of said casing, a sleeve in the upper extension, a shaft journaled in the sleeve and projecting into the lower extension, screw conveyors in said extensions on said sleeve and on the lower end of said shaft, and means for selectively driving said sleeve and shaft to feed material to and withdraw material from said hopper.

9. In a storage hopper, an upright casing comprising conical shells having open ends, the shells being secured together at their base ends to form a unitary casing structure with upper and lower reduced sections forming an extension of the open ends, spaced-apart, vertically disposed, cylindrical shells concentrically mounted within said hopper and spaced from the ends to form compartments, baffles connecting said cylindrical shells and the outer cylindrical shell and lower portion of the casing, a vertical sleeve in the upper reduced section, a vertically disposed shaft in said sleeve and extending from end-to-end of said hopper, a screw conveyor on said sleeve, and a screw conveyor on the lower end of said shaft, means for selectively driving said sleeve and shaft to feed material into and discharge material from said hopper, a feed unit mounted to rotate with said screw conveyor and admit material to said hopper, said feeder unit being formed with a spout leading into the innermost compartment, a branch leg angling outwardly therefrom and leading to the outer compartment, and a center spout leg interjacent said branch leading to the middle compartment so that said compartments are filled consecutively, the inner cylindrical shell terminating at a point below the outer cylindrical shell, and the compartments discharging consecutively in the order in which they are filled.

10. The combination as defined in claim 9 in which a gate normally closes off the outwardly angled branch leg to prevent material flowing into said outer compartment until the inner compartments have been filled.

11. The combination as defined in claim 9 in which a gate is hingedly mounted within said branch, a bracket provided thereon, means for normally maintaining the gate in closed position to seal off the lower end of the branch leg, and a drag latch provided on the end of said means to pivot and release said gate when the material reaches a predetermined level in the middle compartment.

12. In a storage hopper, an upright casing having a lower tapered discharging section terminating in a discharge opening, means separating said casing into substantially concentric chambers, a tubular spout member revolvably supported in said casing above said discharge section with a discharge end feeding into the innermost chamber of said casing and a discharge end feeding into a chamber in said casing outward thereof, means for supplying material to said spout member, and means driving said spout member.

13. In a storage hopper, an upright casing having a lower tapered discharge section terminating in a discharge opening, a side wall and a reduced upper end section, a tubular spout member in said casing including an upper end revolvably supported within the reduced upper end section of said casing and a lower discharge end projecting angularly from said reduced upper end section and terminating at a point spaced a substantial distance from the axis of the casing so as to discharge into the bin at a point outward from the axis at least substantially midway from the axis of the casing to the sidewall thereof, means for supplying material to the reduced upper end section of said casing above said spout member, and means for driving said spout member.

14. The combination defined in claim 13 in which a shaft extends axially into said reduced upper end section and said spout member is mounted thereon, a screw constituting an air baffle being provided on said shaft within said reduced upper end section for positively feeding material to said spout member.

15. In a storage hopper, an upright casing having a lower inwardly tapered discharging section and a reduced upper end section, a drive shaft extending into the upper end section of said casing and downwardly into said discharging section, a screw mounted on the lower end of said shaft for positively discharging material from said casing, a tubular shaft through which said first-mentioned shaft extends extending into the reduced upper end section, and a screw mounted on said tubular shaft in said reduced upper end section for positively feeding material to said casing, and means for selectively driving said first-mentioned shaft and tubular shaft.

16. In a storage hopper, an upright casing having a reduced, substantially vertically disposed upper charge extension and a reduced, substantially vertically disposed discharge extension, a screw in said upper extension constituting an air baffle and positively feeding material to said casing, a drive shaft and a drive sleeve, through which said shaft extends, at least one of which extends from the charge extension to the discharge extension, a screw in said lower extension positively discharging material from said casing one of said screws being drivingly connected to said shaft and the other to said sleeve, and means for selectively driving the shaft and sleeve and thereby the screws in said upper and lower extensions.

17. The combination defined in claim 12 in which means in said spout member blocks flow to said second discharge end until said innermost chamber is substantially filled and thence automatically moves to permit flow through to said second chamber outward thereof.

18. In a storage bin, a relatively rotatable, upright assembly comprising a substantially closed casing and a feeder unit therefor, means in said bin separating said casing into substantially concentric chambers, said feeder unit comprising a tubular spout feeding directly into the innermost chamber and a second spout feeding directly into an outer chamber, means for supplying material to said feeder unit, and means for driving one of said casing and feeder units and circumferentially depositing said material consecutively in said compartments.

19. In a storage bin, a relatively rotatable upright assembly comprising a closed casing and a feeder unit, means in said bin separating said casing into inner and outer compartments, said feeder unit comprising a tubular spout feeding directly into an inner compartment and a second spout feeding directly into an outer compartment, means for supplying material to said feeder unit, means for driving one of said casing and feeder units to circumferentially deposit said material in said compartments, and means normally preventing flow through said second spout automatically operable when said inner compartment is filled to pass material through said second spout to an outer compartment.

20. In a storage hopper, upright enclosed casing means forming a through down passage for material from the upper end to the lower end of substantially the volume enclosed by the casing means and a feeder unit for feeding material into the upper end thereof; said casing means comprising a substantially continuous side wall, an inwardly tapered discharge end, and an upper end wall; said side wall defining a storage compartment open to the reception of material from substantially the axis of the casing means to its said side wall; said feeder unit including a spout in said casing means supported in said upper wall above said discharge end which extends downwardly and terminates in an open end spaced from the side wall and from the axis of the casing means so as to discharge into the casing at a point outward from the axis of the casing and eccentric with respect to the axis thereof; and means for relatively revolving said casing and unit.

References Cited in the file of this patent

UNITED STATES PATENTS

| | | |
|---|---|---|
| 86,410 | Johnson | Feb. 2, 1869 |
| 747,897 | Spangler | Dec. 22, 1903 |
| 1,605,070 | Rockburg | Nov. 2, 1926 |
| 1,960,797 | Sackett | May 29, 1934 |
| 2,089,992 | Campbell et al. | Aug. 17, 1937 |
| 2,146,409 | Straub | Feb. 7, 1939 |
| 2,246,654 | Arveson | June 24, 1941 |